(12) United States Patent
Shimizu

(10) Patent No.: US 7,968,274 B2
(45) Date of Patent: Jun. 28, 2011

(54) OPTICAL WAVEGUIDE MANUFACTURING METHOD

(75) Inventor: Yusuke Shimizu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 266 days.

(21) Appl. No.: 12/478,247

(22) Filed: Jun. 4, 2009

(65) Prior Publication Data

US 2009/0305170 A1    Dec. 10, 2009

Related U.S. Application Data

(60) Provisional application No. 61/074,294, filed on Jun. 20, 2008.

(30) Foreign Application Priority Data

Jun. 10, 2008    (JP) ................................ 2008-152003

(51) Int. Cl.
G02B 6/13    (2006.01)
(52) U.S. Cl. ....................................... 430/321; 430/330
(58) Field of Classification Search .................. None
See application file for complete search history.

(56) References Cited

U.S. PATENT DOCUMENTS 5,292,620 A * 3/1994 Booth et al. ................. 430/290
2004/0013816 A1 * 1/2004 Naitou et al. ................. 427/558
2006/0240269 A1 10/2006 Aoi
2007/0148566 A1 * 6/2007 Choki et al. .................... 430/14

FOREIGN PATENT DOCUMENTS

JP    2006-299066 A    11/2006
JP    2007-11067 A    1/2007

* cited by examiner

*Primary Examiner* — John A. McPherson
(74) *Attorney, Agent, or Firm* — Westerman, Hattori, Daniels & Adrian, LLP

(57) ABSTRACT

An optical waveguide manufacturing method which obviates a developing step and stably provides greater differences in refractive index between a core and cladding layers. A core formation photosensitive resin layer is formed on a surface of an under-cladding layer, and then exposed in a predetermined pattern. A core is formed which is defined by an exposed portion of the core formation photosensitive resin layer. Surfaces of the exposed portion and an unexposed portion of the core formation photosensitive resin layer are covered with an over-cladding layer formation photosensitive resin layer. The two photosensitive resin layers are heated, whereby a resin of the unexposed portion of the core formation photosensitive resin layer and a resin of the over-cladding layer formation photosensitive resin layer are melt-mixed together to form a mixture layer. Then, the mixture layer is exposed, whereby a third cladding layer is formed defined by the exposed mixture layer.

6 Claims, 4 Drawing Sheets

OPTICAL WAVEGUIDE MANUFACTURING METHOD

RELATED APPLICATIONS

This application claims the benefit of U.S. Provisional Application No. 61/074,294, filed Jun. 20, 2008, which is hereby incorporated by reference.

BACKGROUND OF THE INVENTION

1. Field of the Invention

The present invention relates to a manufacturing method of an optical waveguide which is widely used for optical communications, optical information processing and other general optics.

2. Description of the Related Art

Optical waveguides typically include a core provided in a predetermined pattern as a light passage on a surface of an under-cladding layer, and an over-cladding layer covering the core. The core has a higher refractive index than the under-cladding layer and the over-cladding layer adjoining the core for prevention of leak of light passing through the core. As differences in refractive index between the core and the cladding layers increase, the light passing through the core becomes less liable to leak, leading to higher light transmission efficiency. For production of such an optical waveguide, a method employing a photolithography process (see, for example, Japanese Patent Application Laid-Open No. 2007-11067) and a method employing a photo-bleaching process (see, for example, Japanese Patent Application Laid-Open No. 2006-299066) have been proposed.

In an optical waveguide manufacturing method employing the photolithography process, photosensitive resins each having a known refractive index (which is not changed by exposure) are used as materials for the under-cladding layer, the core and the over-cladding layer for setting the differences in refractive index. For the formation of the predetermined core pattern, a core formation photosensitive resin layer formed on the surface of the under-cladding layer is exposed via a photomask formed with an opening pattern conformal to the core pattern, and then developed with a developing solution. Thus, an unexposed portion is dissolved away, and an exposed portion remains as having the predetermined pattern.

In an optical waveguide manufacturing method employing the photo-bleaching process, a single photo-bleaching material is partly exposed for the core formation so as to provide a difference in refractive index between an exposed portion and an unexposed portion (the exposed portion has a reduced refractive index). The unexposed portion, which has a higher refractive index than the exposed portion, serves as the core having the predetermined pattern.

DISCLOSURE OF THE INVENTION

The photolithography process ensures that the differences in refractive index are stably set at a predetermined level, but requires a developing step. This correspondingly increases the number of steps. Further, the material is wasted because the unexposed portion is dissolved away in the development. In addition, the developing solution to be used for the development has a safety problem. Therefore, the photolithography process requires improvement with respect to these points.

The photo-bleaching process does not involve the developing step, but is disadvantageous in that the differences in refractive index are provided with instability and are smaller.

In view of the foregoing, it is an object of the present invention to provide an optical waveguide manufacturing method which obviates the developing step and stably provides greater differences in refractive index between the core and the cladding layers.

According to a first aspect of the present invention to achieve the aforementioned object, there is provided an optical waveguide manufacturing method, which includes the steps of: forming an under-cladding layer; forming a first core formation photosensitive resin layer on a surface of the under-cladding layer; exposing the first core formation photosensitive resin layer in a predetermined pattern to form a core defined by an exposed portion of the first photosensitive resin layer; covering surfaces of the core defined by the exposed portion of the first core formation photosensitive resin layer and an unexposed portion of the first core formation photosensitive resin layer with a second over-cladding layer formation photosensitive resin layer after the exposure; heating the first and second photosensitive resin layers to melt-mix a resin of the unexposed portion of the first core formation photosensitive resin layer and a resin of the second over-cladding layer formation photosensitive resin layer to form a mixture layer; and exposing the mixture layer to form a third cladding layer defined by the exposed mixture layer.

According to a second aspect of the present invention, there is provided an optical waveguide manufacturing method, which includes the steps of: forming a first under-cladding layer formation photosensitive resin layer; forming a second core formation photosensitive resin layer on a surface of the first under-cladding layer formation photosensitive resin layer; forming a third over-cladding layer formation photosensitive resin layer on a surface of the second core formation photosensitive resin layer; exposing the first, second and third photosensitive resin layers in a predetermined pattern to form an under-cladding layer, a core and an over-cladding layer respectively defined by exposed portions of the first, second and third photosensitive resin layers; heating the first, second and third photosensitive resin layers to melt-mix resins of unexposed portions of the first, second and third photosensitive resin layers to form a mixture layer after the exposure, whereby the under-cladding layer, the core and the over-cladding layer respectively defined by the exposed portions of the first, second and third photosensitive resin layers adjoin the mixture layer; and exposing the mixture layer to form a third cladding layer defined by the exposed mixture layer.

In the optical waveguide manufacturing method according to the first inventive aspect, the first core formation photosensitive resin layer is formed on the surface of the under-cladding layer, and then exposed in the predetermined pattern to form the core defined by the exposed portion. Thus, the core is formed on the surface of the under-cladding layer, so that the bottom surface of the core adjoins the under-cladding layer. Here, the under-cladding layer and the core each have a refractive index determined by a material used therefor. Therefore, the refractive indexes of the under-cladding layer and the core can be each set at a predetermined level. In the formation of the core, the unexposed portion of the first core formation photosensitive resin layer (not serving as the core) remains. After the surfaces of the core defined by the exposed portion of the first core formation photosensitive resin layer and the unexposed portion of the first photosensitive resin layer are covered with the second over-cladding layer formation photosensitive resin layer, the resin of the unexposed portion of the first core formation photosensitive resin layer and the resin of the second over-cladding layer formation photosensitive resin layer are melt-mixed together by the heating to form the mixture layer. Then, the mixture layer is exposed, whereby the third cladding layer is formed which is defined by the exposed mixture layer. According to the first inventive aspect, it is possible to form the third cladding layer (corresponding to the over-cladding layer) without the need for the step of removing the unexposed portion by the development. With the third cladding layer thus formed, the top surface and the side surfaces of the core adjoin the third cladding layer. As a result of the mixing, the third cladding layer has a refractive index which is intermediate between the refractive index of the first core formation photosensitive resin layer and the refractive index of the second over-cladding layer formation photosensitive resin layer. The first core formation photosensitive resin layer and the second over-cladding layer formation photosensitive resin layer each have a refractive index determined by a material used therefor. Therefore, the refractive index of the third cladding layer can be set at a predetermined level by properly determining the volume ratio of the unexposed portion of the first core formation photosensitive resin layer and the second over-cladding layer formation photosensitive resin layer (the refractive index of the third cladding layer is generally closer to that of one of the photosensitive resin layers having a greater volume).

In the optical waveguide manufacturing method according to the second inventive aspect, the second core formation photosensitive resin layer and the third over-cladding layer formation photosensitive resin layer are formed in this order on the surface of the first under-cladding layer formation photosensitive resin layer. Then, the first, second and third photosensitive resin layers are exposed in the predetermined pattern, whereby three layers including the under-cladding layer, the core and the over-cladding layer are formed which are respectively defined by the exposed portions of the first, second and third photosensitive resin layers. The three layers are vertically stacked in an exposed region, and the unexposed portions of the first, second and third photosensitive resin layers are located outside the exposed region. Then, the resins of the unexposed portions of the first, second and third photosensitive resin layers are melt-mixed together by the heating to form the mixture layer, which adjoin the three layers including the under-cladding layer, the core and the over-cladding layer defined by the exposed portions of the first, second and third photosensitive resin layers. Then, the mixture layer is exposed, whereby the third cladding layer is formed which is defined by the exposed mixture layer. Thus, the side surfaces of the under-cladding layer, the core and the over-cladding layer adjoin the third cladding layer. Thus, the method according to the second inventive aspect also obviates the need for the step of removing the unexposed portions by the development. As a result of the mixing, the third cladding layer here has a refractive index which is intermediate between the refractive index of the second core formation photosensitive resin layer and a smaller one of the refractive indexes of the first under-cladding layer formation photosensitive resin layer and the third over-cladding layer formation photosensitive resin layer. The first under-cladding layer formation photosensitive resin layer, the second core formation photosensitive resin layer and the third over-cladding layer formation photosensitive resin layer each have a refractive index determined by a material used therefor. Therefore, the refractive index of the third cladding layer is set at the predetermined level by properly determining the volume ratio of the unexposed portions of the first, second and third photosensitive resin layers.

In the optical waveguide manufacturing method according to the first inventive aspect, the unexposed portion is not dissolved away through development after the first core formation photosensitive resin layer is exposed in the predetermined pattern. Thus, the developing step is obviated. Since the under-cladding layer, the core and the third cladding layer of the optical waveguide are each formed of a material having a known refractive index, the refractive indexes of the under-cladding layer, the core and the third cladding layer can be set at the predetermined levels. Therefore, differences in refractive index between the core and the adjoining under-cladding layer and between the core and the adjoining third cladding layer can be provided as calculated.

In the optical waveguide manufacturing method according to the second inventive aspect, the unexposed portions are not dissolved away through development after the first, second and third photosensitive resin layers are exposed in the predetermined pattern. Thus, the developing step is obviated. Since the under-cladding layer, the core, the over-cladding layer and the third cladding layer of the optical waveguide are each formed of a material having a known refractive index, the refractive indexes of the under-cladding layer, the core, the over-cladding layer and the third cladding layer can be set at the predetermined levels. Therefore, differences in refractive index between the core and the adjoining under-cladding layer, between the core and the adjoining over-cladding layer and between the core and the adjoining third cladding layer can be provided as calculated.

Where the first, second and third photosensitive resin layers are simultaneously exposed in the optical waveguide manufacturing method according to the second inventive aspect, the number of steps can be drastically reduced.

Where the heating is carried out at 100° C. to 200° C. for 5 to 30 minutes, the components of the mixture layer to be formed by the heating can be more homogeneously mixed together.

DETAILED DESCRIPTION

Embodiments of the present invention will hereinafter be described in detail with reference to the attached drawings.

Figure 1:
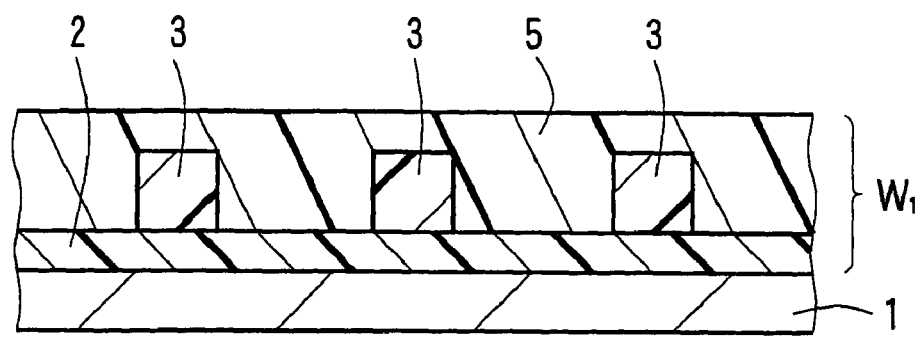
FIG. 1 is an explanatory diagram schematically illustrating an optical waveguide produced by an optical waveguide manufacturing method according to a first embodiment of the present invention.

FIG. 1 illustrates an optical waveguide $W_1$ produced by the optical waveguide manufacturing method according to the first inventive aspect. The optical waveguide $W_1$ is provided on a surface of a substrate 1, and includes an under-cladding layer 2, cores 3 and a third cladding layer 5. The method of producing the optical waveguide $W_1$ will be briefly described. A core formation photosensitive resin layer 3A (see FIG. 2B) is formed on a surface of an under-cladding layer 2 on a substrate 1, and then irradiated with radiation L such as ultraviolet radiation to be exposed in a predetermined pattern. Thus, cores 3 are formed. Without development (without dissolving away an unexposed portion), a surface of the core formation photosensitive resin layer 3A is covered with an over-cladding layer formation photosensitive resin layer 4A (see FIG. 2C). Then, a heat treatment is performed in this state, whereby a resin of the unexposed portion of the core formation photosensitive resin layer 3A and a resin of the over-cladding layer formation photosensitive resin layer 4A are melt-mixed together to form a mixture layer 5A (see FIG. 2D). Then, the mixture layer 5A is exposed, whereby a third cladding layer 5 is formed which is defined by the exposed mixture layer 5A. Thus, the optical waveguide $W_1$ is provided.

Next, the method of producing the optical waveguide $W_1$ will be described in detail.

First, a substrate 1 (see FIG. 2A) is prepared. Examples of the substrate 1 include glass substrates, metal substrates such as of stainless steel (SUS), and resin substrates such as of a polyethylene terephthalate (PET). The substrate 1 has a thickness of, for example, 20 μm to 1 mm.

Figure 2A:
FIGS. 2A to 2D are explanatory diagrams schematically showing the optical waveguide manufacturing method according to the first embodiment of the present invention.

In turn, as shown in FIG. 2A, an under-cladding layer 2 is formed on a predetermined region of the substrate 1. The formation of the under-cladding layer 2 is achieved, for example, in the following manner. First, a varnish prepared by dissolving an under-cladding layer formation photosensitive resin in a solvent is applied on the substrate 1. Examples of the photosensitive resin include photosensitive epoxy resins. The application of the varnish is achieved, for example, by a spin coating method, a dipping method, a casting method, an injection method, an ink jet method or the like. As required, the resulting coating layer is dried by a heat treatment. The heat treatment is typically performed at 50° C. to 120° C. for 10 to 30 minutes with the use of a hot plate, an oven or the like. Thus, an under-cladding layer formation photosensitive resin layer 2A is formed.

Subsequently, the photosensitive resin layer 2A is exposed to radiation. Examples of the radiation for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 mJ/cm$^2$.

After the exposure, a heat treatment is performed for completion of a photoreaction. The heat treatment is typically performed at 80° C. to 250° C. for 10 seconds to 2 hours. Thus, the photosensitive resin layer 2A is formed into the under-cladding layer 2 as shown in FIG. 2A. The under-cladding layer 2 typically has a thickness of 1 to 50 μm.

Figure 2B:
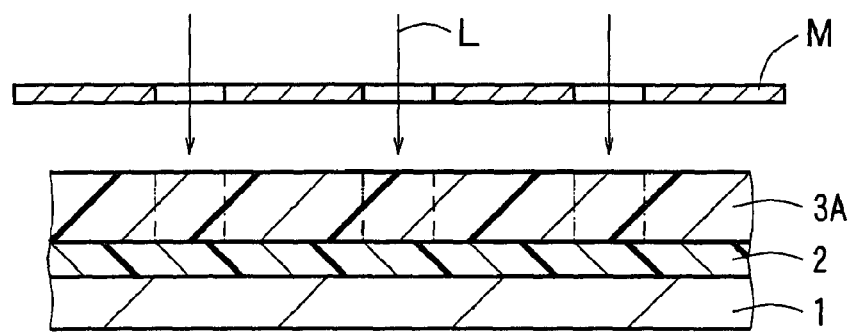
Figure 2C:
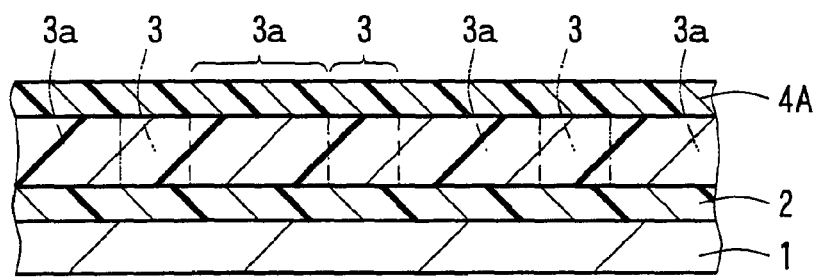

Then, as shown in FIG. 2B, a core formation photosensitive resin layer 3A is formed (in an uncured state) on a surface of the under-cladding layer 2. The formation of the photosensitive resin layer 3A is achieved in substantially the same manner as the formation of the under-cladding layer formation photosensitive resin layer 2A described with reference to FIG. 2A. A core formation photosensitive resin has a higher refractive index than the aforementioned under-cladding layer formation photosensitive resin and an over-cladding layer formation photosensitive resin to be described later. The refractive index may be adjusted, for example, by selection of the types of the photosensitive resins and adjustment of the composition ratio.

Subsequently, a photomask M formed with an opening pattern conformal to cores 3 (see FIG. 2C) is placed on the core formation photosensitive resin layer 3A, and portions of the photosensitive resin layer 3A conformal to the opening pattern are exposed to radiation L via the photomask M. Then, a heat treatment is performed for completion of a photoreaction. The exposure and the heat treatment are carried out in the same manner as in the formation of the under-cladding layer 2 described above. Thus, the exposed portions are cured, whereby the cores 3 are formed. The cores 3 typically each have a thickness (height) of 10 to 150 μm, and a width of 8 to 50 μm.

In turn, surfaces of the exposed portions (cores 3) and an unexposed portion (uncured portion) 3a of the core formation photosensitive resin layer 3A are covered with an (uncured) over-cladding layer formation photosensitive resin layer 4A without development (without dissolving away the unexposed portion). The covering with the photosensitive resin layer 4A is achieved in the same manner as in the formation of the under-cladding layer formation photosensitive resin layer 2A described with reference to FIG. 2A. The photosensitive resin layer 4A typically has a thickness of 5 to 100 μm.

Figure 2D:
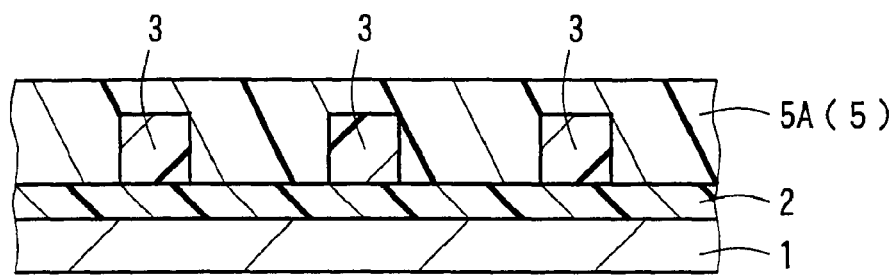

Then, a heat treatment is performed. By the heat treatment, the resin of the unexposed portion 3a of the core formation photosensitive resin layer 3A and the resin of the over-cladding layer formation photosensitive resin layer 4A are melted and convected to be mixed together. Thus, a mixture layer 5A is formed as shown in FIG. 2D. For homogenous mixing of the components of the mixture layer 5A, the heat treatment is preferably performed at 100° C. to 120° C. for 5 to 30 minutes. If the heat treatment is performed at a temperature lower than 100° C. for a period shorter than 5 minutes, the mixing is insufficient, resulting in a less homogeneous mixture layer 5A. As a result, an optical waveguide $W_1$ (see FIG. 1) produced through the subsequent steps will have a greater light transmission loss. If the heat treatment is performed at a temperature higher than 200° C. for a period longer than 30 minutes, the cores 3 are liable to be melted.

Thereafter, the mixture layer 5A is exposed and heat-treated for completion of a photoreaction in the same manner as in the formation of the under-cladding layer 2, whereby a third cladding layer 5 is formed which is defined by the exposed mixture layer 5A. Thus, top surfaces and side surfaces of the cores 3 adjoin the third cladding layer 5. As a result of the mixing, the third cladding layer 5 here has a refractive index which is intermediate between the refractive index of the core formation photosensitive resin layer 3A and the refractive index of the over-cladding layer formation photosensitive resin layer 4A. The core formation photosensitive resin layer 3A and the over-cladding layer formation photosensitive resin layer 4A each have a refractive index determined by a material used therefor. Therefore, the refractive index of the third cladding layer 5 can be set at a predetermined level by properly determining the volume ratio of the unexposed portion 3a of the core formation photosensitive resin layer 3A and the over-cladding layer formation photosensitive resin layer 4A.

Thus, the optical waveguide $W_1$ including the under-cladding layer 2, the cores 3 and the third cladding layer 5 is produced on the surface of the substrate 1. The optical waveguide $W_1$ produced on the surface of the substrate 1 may be used as it is, or may be separated from the substrate 1 for use.

In the prior-art photolithography process, the formation of the cores involves the exposure via the photomask, and the exposure is likely to roughen the side surfaces of the cores. The roughened side surfaces of the cores will adversely affect the light transmission through the cores. On the contrary, the optical waveguide $W_1$ produced in the aforementioned manner according to this embodiment is different from the optical waveguide produced through the prior-art photolithography process in that the top surfaces and the side surfaces of the cores 3 adjoining the third cladding layer 5 are not roughened. Therefore, the light transmission is less liable to be adversely affected by the roughened side surfaces of the cores 3, so that the light transmission loss is effectively reduced.

In the first embodiment, the formation of the under-cladding layer 2 is achieved by exposing the coating layer of the varnish prepared by dissolving the under-cladding layer formation photosensitive resin in the solvent. Alternatively, a resin film having a function as the under-cladding layer 2 may be used as it is as the under-cladding layer 2.

Figure 3:
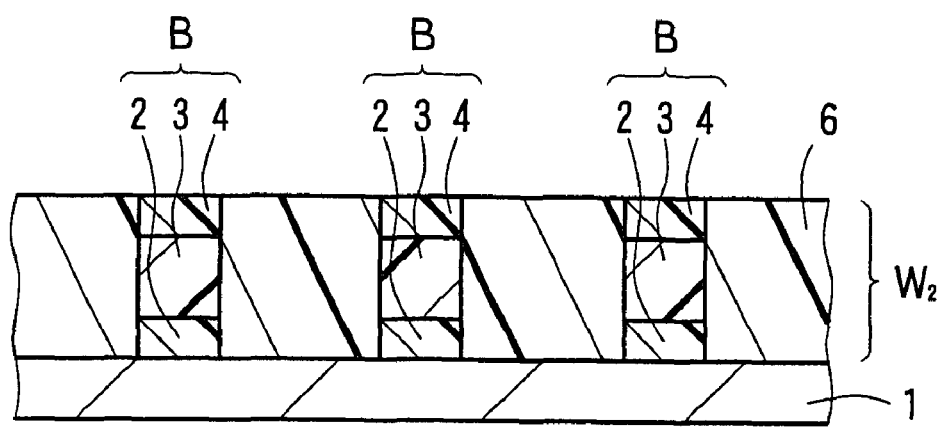
FIG. 3 is an explanatory diagram schematically illustrating an optical waveguide produced by an optical waveguide manufacturing method according to a second embodiment of the present invention.

FIG. 3 illustrates an optical waveguide $W_2$ produced by an optical waveguide manufacturing method according to a second inventive aspect. The optical waveguide $W_2$ is provided on a surface of a substrate 1, and includes laminates each including an under-cladding layer 2, a core 3 and an over-cladding layer 4 stacked one on another in a predetermined region of the substrate and a third cladding layer 6 provided laterally outward of the laminates. The method of producing the optical waveguide $W_2$ will be briefly described. After an under-cladding layer formation photosensitive resin layer 2A, a core formation photosensitive resin layer 3A and an over-cladding layer formation photosensitive resin layer 4A are formed in this order on a surface of a substrate 1, these three photosensitive resin layers 2A, 3A, 4A (see FIG. 4A) stacked one on another are irradiated with radiation L such as ultraviolet radiation to be exposed in a predetermined pattern (see FIG. 4B). Thus, under-cladding layers 2, cores 3 and over-cladding layers 4 are formed which are defined by exposed portions of the photosensitive resin layers 2A, 3A and 4A, respectively. Resins of unexposed portions 2a, 3a, 4a of the three photosensitive resin layers 2A, 3A, 4A are melt-mixed together by a heat treatment without development (without dissolving away the unexposed portions), whereby a mixture layer 6A (see FIG. 4C) is formed. In turn, the mixture layer 6A is exposed, whereby a third cladding layer 6 is formed which is defined by the exposed mixture layer 6A. Thus, the optical waveguide $W_2$ is provided.

Next, the method of producing the optical waveguide $W_2$ will be described in detail.

Figure 4A:
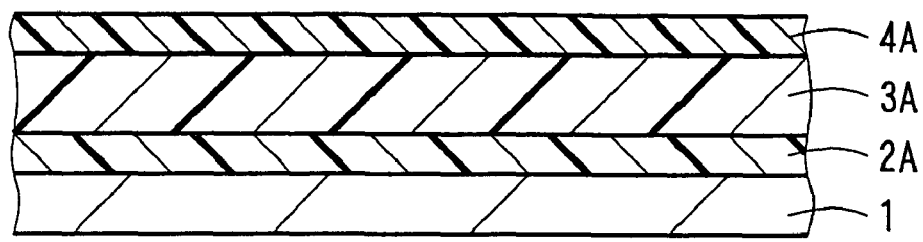
FIGS. 4A to 4C are explanatory diagrams schematically showing the optical waveguide manufacturing method according to the second embodiment of the present invention.

First, as shown in FIG. 4A, an under-cladding layer formation photosensitive resin layer 2A is formed (in an uncured state) on a predetermined region of a substrate 1 in the same manner as in the first embodiment.

In turn, a core formation photosensitive resin layer 3A is formed (in an uncured state) on a surface of the under-cladding layer formation photosensitive resin layer 2A by laminating. The laminating is achieved, for example, in the following manner. First, the core formation photosensitive resin layer 3A is formed (in an uncured state) on a predetermined region of a PET base in substantially the same manner as in the first embodiment. Then, the core formation photosensitive resin layer 3A is combined with the under-cladding layer formation photosensitive resin layer 2A by means of a laminator. Thereafter, the PET base is removed from the core formation photosensitive resin layer 3A. Thus, the laminating is achieved.

In turn, an over-cladding layer formation photosensitive resin layer 4A is formed (in an uncured state) on a surface of the core formation photosensitive resin layer 3A by laminating. The laminating is achieved in substantially the same manner as described above.

Figure 4B:
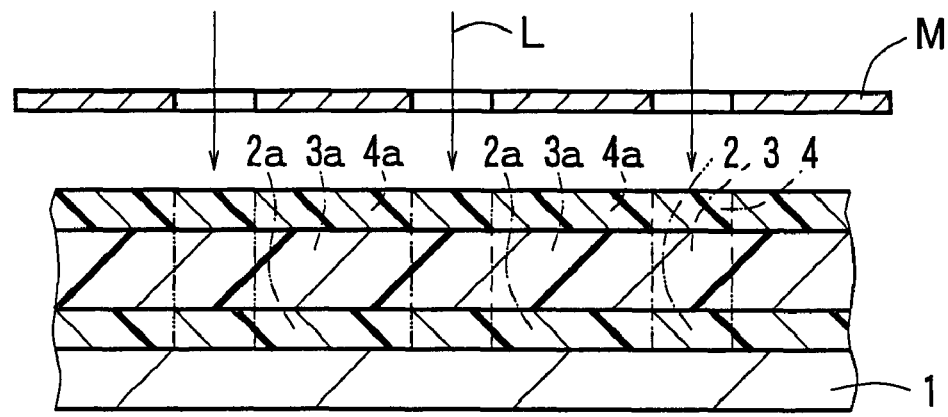

Thereafter, as shown in FIG. 4B, a photomask M formed with an opening pattern conformal to cores 3 is placed on the over-cladding layer formation photosensitive resin layer 4A, and portions of the three photosensitive resin layers 2A, 3A, 4A conformal to the opening pattern are simultaneously exposed to radiation L via the photomask M. Then, as required, a heat treatment is performed for completion of a photoreaction. The exposure and the heat treatment are carried out in substantially the same manner as in the first embodiment described above. Thus, the exposed portions of the three layers are cured, whereby under-cladding layers 2, cores 3 and over-cladding layers 4 are formed in this order from the lower side.

Figure 4C:
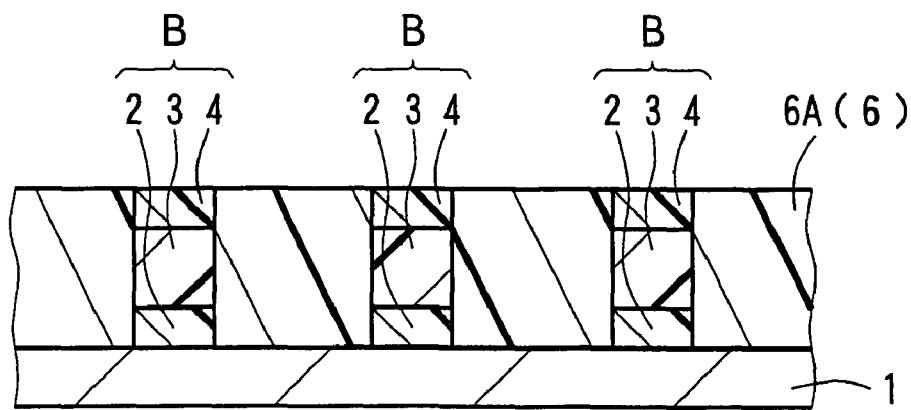

Then, as shown in FIG. 4C, a heat treatment is performed in the same manner as in the first embodiment described above without development (without dissolving away unexposed portions). Thus, resins of the unexposed portions 2a, 3a, 4a of the three photosensitive resin layers 2A, 3A, 4A are melted and convected to be mixed together, whereby a mixture layer 6A is formed. The mixture layer 6A adjoins side surfaces of the exposed portions of the three layers (side surfaces of triple-layer laminates B each including the under-cladding layer 2, the core 3 and the over-cladding layer 4).

Thereafter, the mixture layer 6A is exposed, and heat-treated for completion of a photoreaction in the same manner as in the first embodiment described above, whereby a third cladding layer 6 is formed which is defined by the exposed mixture layer 6A. Thus, the side surfaces of the under-cladding layers 2, the cores 3 and the over-cladding layers 4 adjoin the third cladding layer 6. As a result of the mixing, the third cladding layer 6 here has a refractive index which is intermediate between the refractive index of the core formation photosensitive resin layer 3A and a smaller one of the refractive indexes of the under-cladding layer formation photosensitive resin layer 2A and the over-cladding layer formation photosensitive resin layer 4A. The under-cladding layer formation photosensitive resin layer 2A, the core formation photosensitive resin layer 3A and the over-cladding layer formation photosensitive resin layer 4A each have a refractive index determined by a material used therefor. Therefore, the refractive index of the third cladding layer 6 is set at a predetermined level by properly determining the volume ratio of the unexposed portions 2a, 3a, 4a of the three photosensitive resin layers 2A, 3A, 4A.

Thus, the optical waveguide $W_2$ including the under-cladding layers 2, the cores 3, the over-cladding layers 4 and the third cladding layer 6 is produced on the surface of the substrate 1. The optical waveguide $W_2$ produced on the surface of the substrate 1 may be used as it is, or may be separated from the substrate 1 for use.

The optical waveguide $W_2$ is different from the optical waveguide produced through the prior-art photolithography process in that it includes the triple-layer laminates B each including the under-cladding layer 2, the core 3 and the over-cladding layer 4 stacked one on another and having the same pattern, and the third cladding layer 6 adjoin the side surfaces of the triple-layer laminates B. Further, the optical waveguide $W_2$ is different from the optical waveguide produced through the prior-art photolithography process in that the side surfaces of the cores 3 adjoining the third cladding layer 5 are not roughened. Thus, the light transmission is less liable to be adversely affected by the roughened side surfaces of the cores 3 attributable to the exposure via the photomask, so that the light transmission loss is effectively reduced.

In the second embodiment described above, the three photosensitive resin layers 2A, 3A, 4A stacked one on another are simultaneously exposed in the predetermined pattern. Alternatively, the three photosensitive resin layers 2A, 3A, 4A may be separately exposed in the predetermined pattern after each of the three photosensitive resin layers 2A, 3A, 4A is formed by laminating.

In the second embodiment described above, the core formation photosensitive resin layer 3A is formed on the surface of the under-cladding layer formation photosensitive resin layer 2A by the laminating. Alternatively, the formation of the core formation photosensitive resin layer 3A may be achieved by application of the core formation photosensitive resin as in the first embodiment described above. Similarly, the formation of the over-cladding layer formation photosensitive resin layer 4A may be achieved by application of the over-cladding layer formation photosensitive resin rather than by the laminating. In the first embodiment described above, conversely, the formation of the core formation photosensitive resin layer 3A and the over-cladding layer formation photosensitive resin layer 4A may be achieved by the laminating as in the second embodiment described above.

Inventive examples will be described in conjunction with a reference example. It should be understood that the present invention be not limited to the inventive examples.

EXAMPLES

Under-Cladding Layer Material and Over-Cladding Layer Material

An under-cladding layer material and an over-cladding layer material were prepared by mixing 100 parts by weight of a wholly aliphatic epoxy (SUN-TOHTO ST4000D available from Tohto Kasei Co., Ltd.) as a curable monomer, 4 parts by weight of a 50% propione carbonate solution of 4,4'-bis[di($\beta$-hydroxyethoxy) phenylsulfinio]phenylsulfide bishexafluoroantimonate as a photoacid generator and dissolving the resulting mixture in ethyl lactate.

Core Material

A core material was prepared by mixing 40 parts by weight of bisphenoxyethanolfluorene glycidyl ether (OGSOL EG available from Nagase ChemteX Corporation), 30 parts by weight of a multi-functional fluorene epoxy (ONCOAT EX-1040 available from Nagase ChemteX Corporation), 30 parts by weight of 1,3,3-tris{4-[2-(3-oxetanyl)]butoxyphenyl} butane and 1 part by weight of a 50% propione carbonate solution of 4,4'-bis[di($\beta$-hydroxyethoxy)phenylsulfinio] phenylsulfide bishexafluoroantimonate as a photoacid generator and dissolving the resulting mixture in ethyl lactate.

Example 1

Production of Optical Waveguide (See the First Embodiment Described Above)

The under-cladding layer material was applied on a surface of a glass substrate (140 mm×140 mm) by a spin coating method to form a coating layer having a thickness of 20 μm. In turn, the solvent was removed by heating the resulting substrate at 100° C. for 5 minutes on a hot plate. Thus, an under-cladding layer formation photosensitive resin layer was formed. Then, the entire surface of the photosensitive resin layer was irradiated with ultraviolet radiation to be exposed at a dose of 1000 mJ/cm$^2$. Thereafter, the resulting photosensitive resin layer was heated at 120° C. for 5 minutes on the hot plate, whereby an under-cladding layer (having a thickness of 20 μm) was formed. The under-cladding layer had a refractive index of 1.505 at a wavelength of 830 nm.

Subsequently, the core material was applied on a surface of the under-cladding layer by a spin-coating method to form a coating layer having a thickness of 50 μm. In turn, the solvent was removed by heating the resulting substrate at 100° C. for 5 minutes on the hot plate. Thus, a core formation photosensitive resin layer was formed. Then, the core formation photosensitive resin layer was irradiated with ultraviolet radiation (i line) via a photomask formed with a linear opening pattern having an opening width of 50 μm by a proximity exposure method (with a print gap of 50 μm) to be exposed at a dose of 2500 mJ/cm$^2$. Thereafter, the resulting substrate was heated at 100° C. for 10 minutes on the hot plate. Thus, cores (each having a width of 50 μm and a height of 50 μm) were formed which were defined by linear exposed portions of the core formation photosensitive resin layer. The cores each had a refractive index of 1.592 at a wavelength of 830 nm.

Then, the over-cladding layer material was applied over surfaces of the exposed portions (cores) and an unexposed portion (uncured portion) of the core formation photosensitive resin layer by a spin coating method. Thus, a coating layer (photosensitive resin layer) having a thickness of 20 μm was formed.

In turn, the resulting substrate was heated at 125° C. for 15 minutes on the hot plate, whereby the resin of the unexposed portion of the core formation photosensitive resin layer and the resin of the over-cladding layer formation photosensitive resin layer were melted and convected to be homogeneously mixed together. Thus, a mixture layer was formed.

Thereafter, the mixture layer was irradiated with ultraviolet radiation to be exposed at a dose of 1000 mJ/cm$^2$. Then, the resulting substrate was heated at 120° C. for 5 minutes, whereby a third cladding layer was formed which was defined by the exposed mixture layer. Thus, an optical waveguide of Example 1 was produced on the surface of the glass substrate.

Example 2

Production of Optical Waveguide (See the Second Embodiment Described Above)

An under-cladding layer formation photosensitive resin layer was formed on a surface of a glass substrate in the same manner as in Example 1.

Subsequently, the core material was applied on a surface of a PET base (140 mm×140 mm×0.1 mm (thickness)) by means of an applicator, whereby a coating layer having a thickness of 50 μm was formed. Then, the solvent was removed by heating the resulting base at 100° C. for 5 minutes in an oven. Thus, a core formation photosensitive resin layer was formed. Then, the core formation photosensitive resin layer was combined with the under-cladding layer formation photosensitive resin layer (at a laminating temperature of 50° C. at a pressure of 19.6 N) by means of a laminator. Thereafter, the PET base was separated from the core formation photosensitive resin layer. Thus, the core formation photosensitive resin layer was formed on a surface of the under-cladding layer formation photosensitive resin layer.

In turn, an over-cladding layer formation photosensitive resin layer was formed on a surface of a PET base. Then, the core formation photosensitive resin layer was laminated with the over-cladding layer formation photosensitive resin layer.

Thereafter, the three photosensitive resin layers were irradiated with ultraviolet radiation (i line) via a photomask formed with a linear opening pattern having an opening width of 50 μm by a proximity exposure method (with a print gap of 50 μm) to be exposed at a dose of 2500 mJ/cm$^2$. Thus, exposed linear portions of the three layers were cured, whereby under-cladding layers, cores and over-cladding layers were formed in this order from the lower side.

Then, the resulting substrate was heated at 120° C. for 30 minutes on a hot plate, whereby the resins of unexposed portions of the three photosensitive resin layers were melted and convected to be homogeneously mixed together. Thus, a mixture layer was formed.

Thereafter, the mixture layer was irradiated with ultraviolet radiation to be exposed at a dose of 1000 mJ/cm$^2$. Then, the resulting substrate was heated at 120° C. for 5 minutes on the hot plate, whereby a third cladding layer was formed which was defined by the exposed mixture layer. Thus, an optical waveguide of Example 2 was formed on the surface of the glass substrate.

Reference Example 1

Production of Optical Waveguide by Photolithography Process

An under-cladding layer and a core formation photosensitive resin layer were formed on a surface of a glass substrate in the same manner as in Example 1, and the core formation photosensitive resin layer was exposed in a linear pattern, followed by heating. In turn, a developing process was performed with the use of a 90 wt % γ-butyrolactone developing solution to dissolve away an unexposed portion of the core formation photosensitive resin layer. Thus, cores were formed. Thereafter, the developing solution remaining in surfaces of the cores and the like was removed by a heat treatment. Then, an over-cladding layer formation photosensitive resin layer was formed as covering the cores in the same manner as in Example 1, and then exposed and heated. Thus, an over-cladding layer was formed.

Measurement of Optical Transmission Loss

Optical waveguides of Examples 1 and 2 and Reference Example 1 were each cut to a length of 10 cm along a core, and the light transmission loss of each of the optical waveguides was measured. The light transmission loss was 1.56 in Example 1, 1.73 in Example 2, and 1.50 in Reference Example 1.

The above results indicate that the optical waveguides produced by the methods of Examples 1 and 2 are comparable in light transmission property to the optical waveguide produced through the photolithography process of Reference Example 1. For the production of the optical waveguides having substantially the same light transmission property, Examples 1 and 2 obviate the developing step as compared with Reference Example 1. Therefore, Examples 1 and 2 require a reduced number of steps, and are safe without the use of the developing solution which has a safety problem.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide manufacturing method comprising the steps of:
   forming an under-cladding layer;
   forming a first core formation photosensitive resin layer on a surface of the under-cladding layer;
   exposing the first core formation photosensitive resin layer in a predetermined pattern to form a core defined by an exposed portion of the first photosensitive resin layer;
   covering surfaces of the core defined by the exposed portion of the first core formation photosensitive resin layer and an unexposed portion of the first core formation photosensitive resin layer with a second over-cladding layer formation photosensitive resin layer after the exposure;
   heating the first and second photosensitive resin layers to melt-mix a resin of the unexposed portion of the first core formation photosensitive resin layer and a resin of the second over-cladding layer formation photosensitive resin layer to form a mixture layer; and
   exposing the mixture layer to form a third cladding layer defined by the exposed mixture layer.

2. An optical waveguide manufacturing method as set forth in claim 1, wherein the heating is carried out at 100° C. to 200° C. for 5 to 30 minutes.

3. An optical waveguide manufacturing method comprising the steps of:
   forming a first under-cladding layer formation photosensitive resin layer;
   forming a second core formation photosensitive resin layer on a surface of the first under-cladding layer formation photosensitive resin layer;
   forming a third over-cladding layer formation photosensitive resin layer on a surface of the second core formation photosensitive resin layer;
   exposing the first, second and third photosensitive resin layers in a predetermined pattern to form an under-cladding layer, a core and an over-cladding layer respectively defined by exposed portions of the first, second and third photosensitive resin layers;
   heating the first, second and third photosensitive resin layers to melt-mix resins of unexposed portions of the first, second and third photosensitive resin layers to form a mixture layer after the exposure, whereby the under-cladding layer, the core and the over-cladding layer respectively defined by the exposed portions of the first, second and third photosensitive resin layers adjoin the mixture layer; and
   exposing the mixture layer to form a third cladding layer defined by the exposed mixture layer.

4. An optical waveguide manufacturing method as set forth in claim 3, wherein the first, second and third photosensitive resin layers are simultaneously exposed.

5. An optical waveguide manufacturing method as set forth in claim 4, wherein the heating is carried out at 100° C. to 200° C. for 5 to 30 minutes.

6. An optical waveguide manufacturing method as set forth in claim 3, wherein the heating is carried out at 100° C. to 200° C. for 5 to 30 minutes.

* * * * *